Nov. 23, 1954  B. B. IVANEK  2,695,156
VALVE FOR CONTROLLING THE FLOW OF MILK AND THE LIKE
Filed Feb. 24, 1951  3 Sheets-Sheet 1

INVENTOR.
Boles B. Ivanek
BY
Kenyon & Kenyon
ATTORNEYS

Nov. 23, 1954 B. B. IVANEK 2,695,156
VALVE FOR CONTROLLING THE FLOW OF MILK AND THE LIKE
Filed Feb. 24, 1951 3 Sheets-Sheet 2

INVENTOR.
Boles B Ivanek
BY
Kenyon & Kenyon
ATTORNEYS

Nov. 23, 1954 — B. B. IVANEK — 2,695,156

VALVE FOR CONTROLLING THE FLOW OF MILK AND THE LIKE

Filed Feb. 24, 1951 — 3 Sheets-Sheet 3

INVENTOR.
Boles B Ivanek
BY Kenyon & Kenyon
ATTORNEYS

United States Patent Office 2,695,156
Patented Nov. 23, 1954

2,695,156

VALVE FOR CONTROLLING THE FLOW OF MILK AND THE LIKE

Boles B. Ivanek, New York, N. Y.

Application February 24, 1951, Serial No. 212,552

5 Claims. (Cl. 251—264)

This invention relates to a valve developed particularly for the purpose of controlling the flow of milk through pipes in dairies. In this service valves must be periodically disassembled, cleaned, sterilized and reassembled. It is to be understood that the new valve may be used for controlling the flow of other beverages and, in general, wherever the advantages of its design are desired.

One of the objects which led to the development of this invention was to provide a valve as free as possible from internal joints, crevices or other places which might trap material or be difficult to clean, while at the same time having this valve capable of easy and rapid dismantling into separate parts permitting cleaning and sterilization. It was also desired that the valve be capable of rapid and easy reassembly. Another object was to develop a valve accomplishing the foregoing and which when in service would be substantially leak-proof. Still another objective was to make such a valve so that it could always be opened and shut rapidly and easily. Other objectives will become apparent from the following.

In order to disclose the principles and operation of the invention a specific example of the invention in the form of a milk valve is illustrated by the accompanying drawings which are described below.

Figure 1:
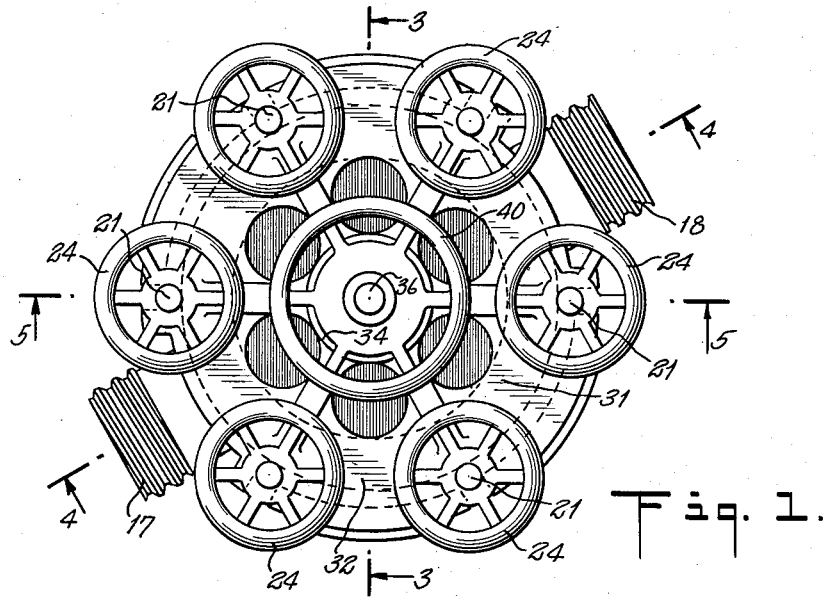
Figure 2:
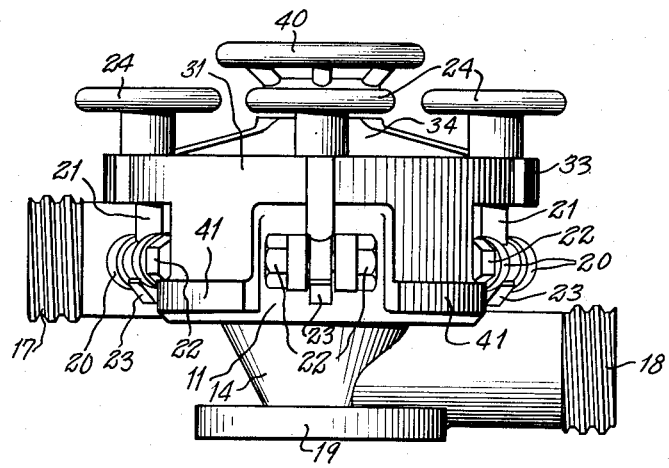
Figures 3, 4, 5:
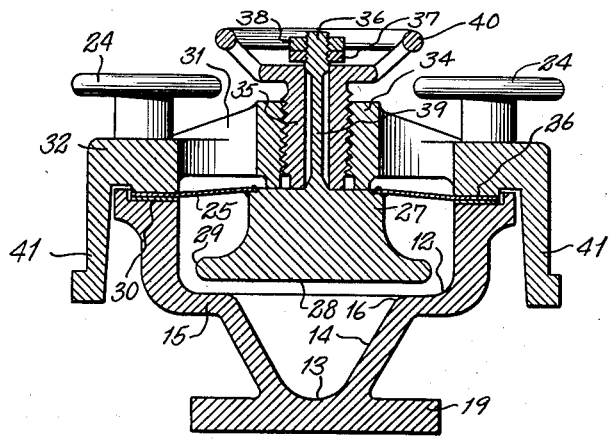
Figure 6:
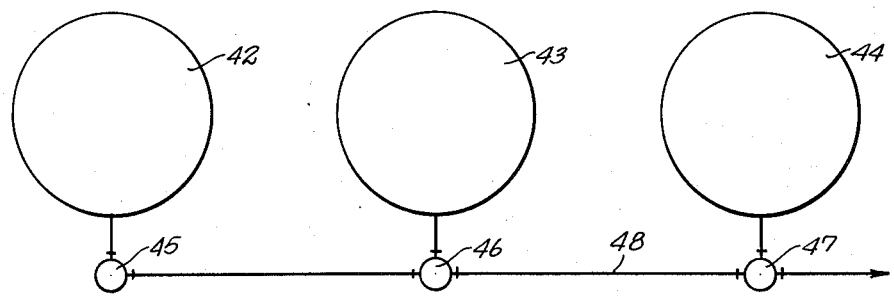
Figure 7:
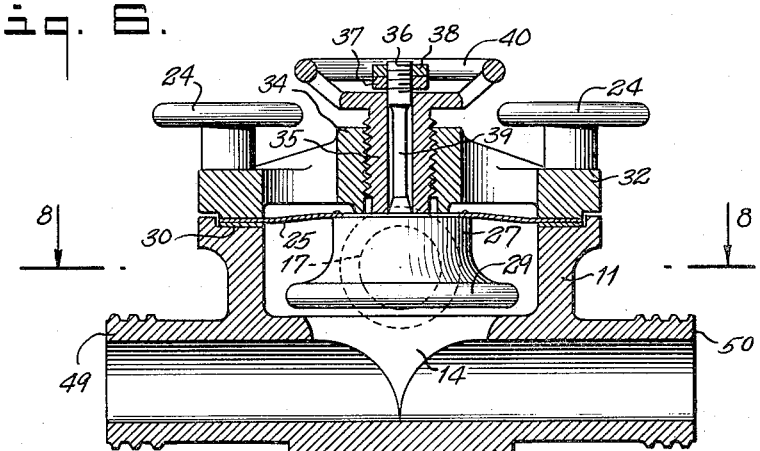
Figure 8:
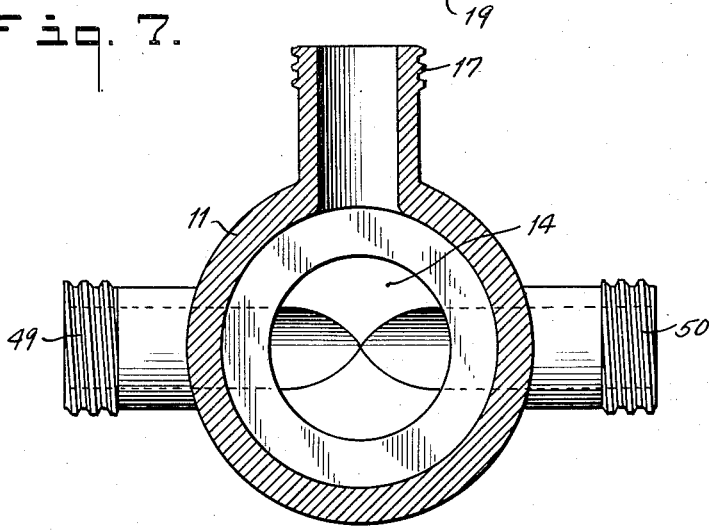

In these drawings:

Fig. 1 is a top view of the valve;
Fig. 2 is a side view;
Fig. 3 is a vertical section taken on the line 3—3 in Fig. 1;
Fig. 4 is a vertical section taken on the line 4—4 in Fig. 1;
Fig. 5 is a vertical section taken on the line 5—5 in Fig. 1;
Fig. 6 is a schematic showing of an example of how milk valves may be called upon to operate in a dairy;
Fig. 7 is a vertical section of a modified form of the valve particularly adapted to serve as indicated in Fig. 6; and
Fig. 8 is a horizontal section taken on the line 8—8 in Fig. 7.

This illustrated valve is in the form of a two-part device. As indicated it is particularly adapted for controlling the flow of milk in dairies, this requiring a valve capable of periodic disassembly, cleaning sterilization and reassembly.

One part of this device comprises a one-piece integral casing internally forming a cup 11 having a smoothly concave junction 12 between its side and bottom walls and a well having a rounded bottom 13 and a flaring side wall 14 which opens centrally through the bottom wall 15 of the cup 11 with a smoothly convex junction 16 therewith. This casing part has an externally threaded pipe coupling stub 17 with its bore opening smoothly into the side wall of the cup 11, and another pipe coupling stub 18 with its bore opening smoothly through the wall 14 of the well beneath the cup. All of the elements of this part are integral and internally free from cracks, crevices and the like, and there are no threaded joints exposed to the fluid flow. The bottom of the well is externally provided with a platform 19 having a flat bottom surface broad enough to support this casing part upright when the platform bottom is rested on a flat surface.

In addition to the above, the outside of this casing part is peripherally provided with sets of spaced brackets 20 which are integral with the balance of the casing. A swinging bolt 21 has its lower end pivoting between each set of brackets 20 by bolt and nut fastenings 22. The upper ends of these bolts 21 swing radially from above the top of the casing part, and their bottom ends each have a short V-shaped arm 23 arranged to engage the outside of the casing and limit the outward swinging of the bolt to prevent it from swinging down to a level below the bottom of the platform 19. The upper ends of the bolts 21 are provided with hand wheel nuts 24 adapted to be screwed manually. Each of the short arms 23 is symmetrical about the axis of its bolt so that if the bolt is removed it is immaterial how it is oriented when replaced, one or the other of the sides of the V-shape serving as an abutment performing the described function by engagement of the outside of the casing. It is to be understood that the outward swinging of each bolt is limited sufficiently to keep the periphery of its hand wheel nut 24 safely above the lower level of the platform 19.

All of the elements of the casing part up to and including the brackets 20 may be formed by an integral casting. The outside contour is shown as generally following the inside contour with the wall thickness adequate to permit easy casting when using metal. This part may be in the form of a stainless steel casting with all of its interior surfaces polished. However, any suitable material may be used in this instance or in other instances hereinafter where specific materials are suggested.

The other or second part of this two-part device is in the form of a flexible sheet-like wall 25 having a periphery 26 fitting the periphery of the casing part around the upper or top edge part of the cup 11. A valve is provided with a base 27 smoothly joined integrally and continuously throughout with the inside of the wall 25 and inside of and radially spaced from its periphery 26. This valve downwardly flares from its base 27 in a smoothly concave manner to a head 28 fitting the bottom of the cup 11 around the previously described well. This head is smoothly joined integrally with the valve base 27 by a convex rim portion 29.

As shown the wall 25 is in the form of an annulus which is welded integrally to the base 27 of the valve. The described valve may be formed by a single body of stainless steel with its surfaces polished, and the wall 27 may be made from stainless steel sheet and have its bottom polished. This flexible wall closes the open top of the first described casing part when the wall's periphery 26 is placed on top of the periphery of the cup 11. The wall may be considered as being formed by the rigid head and by the annulus which provides a flexible annular portion with these two elements forming in effect a single piece entirely free from cracks, crevices or the like. A disposable paper gasket 30 may be used between the two peripheral parts to form a fluid-tight joint. This is the only joint on the inside of the valve device through which the milk must flow.

This second part further includes a cap 31 having an outer ring portion 32 registering with the casing and wall peripheries previously described. This outer ring portion 32 is provided with outwardly extending and radially slotted ears constructed and arranged so that slots are provided into which the various bolts 21 may radially swing. When these bolts are swung into these ears, and the nuts 24 are tightened down, the cap is clamped to the casing part so as to provide the latter fluid-tightly with the described valve head and flexible wall arrangement.

As illustrated this cap 31 may be of an open frame construction in the interests of light weight. It includes an inner ring or nut-like portion 34 through which a valve stem arrangement operates. This arrangement comprises an externally screw-threaded tubular member 35 screwed through the inner ring portion 34 so as to register loosely with the top of the valve's base 27 outside of the wall 25. A rod 36 connects with the valve's base 27, this rod being shown as an integral part of the valve. This rod 36 projects upwardly and outwardly loosely through the tubular member 35 and loosely engages the outer end of this member. This engagement is effected by having the upper end of the rod 36 screw threaded and provided with an abutment, for the top of the member 35, in the form of a nut 37 and a jam nut 38. The rod 36 rigidly joins with the base 27 of the valve and this rod has a central portion 39 which is made with a reduced section. This rod is spaced throughout the inside of the tubular member 35. The upper end of the member 35 is formed to provide a hand wheel 40 which serves to rotate the member 35, the latter acting as a screw.

The cap 31 is designed to provide clearance for the wall 25 so that the latter may flex up and down upon operation of the member 35 by turning of the hand wheel 40. When the hand wheel 40 is turned down the lower end of the member 35 engages the top of the valve's base 27 and pushes its head 28 down so that it seats or closes on the bottom 15 of the cup 11. It is possible for this screw-acting member 35 to work diagonally respecting the desired valve action direction, this possibly occurring in the event the various hand wheel nuts 24 are screwed down unevenly. When this occurs the rod 39 is free to flex laterally so that, although working diagonally, the member 35 can uniformly set the valve head 28 to provide an adequate valve closing action. The rod 39 is reduced in cross section, or otherwise designed, so that its elastic resistance to flexure is less than the strength of the cap 31 and its associated parts, thus avoiding damage to any of the cap elements.

The rod 39 is used to lift the valve to its open position when the hand wheel 40 is reversely turned to unscrew the member 35. Thus a two-way action is provided for moving the valve head to its open and closed positions without introducing such rigidity as to prevent proper closing of the valve in case the two parts of the device are improperly assembled. Furthermore, in such an event the parts are relieved from stress which might otherwise cause them to be damaged.

In addition to the foregoing the second or cap part of the device has its outer ring portion 32 shaped to provide depending legs 41 in the form of an arrangement embracing the casing when the two parts are clamped together. This leg arrangement is shaped to support the wall 25 with its valve arrangement hanging therefrom with the head 28 free and protected, when the cap part is separated from the casing part and this leg arrangement is rested on a supporting surface. As illustrated the legs 41 are in the form of a plurality of depending parts peripherally spaced to span the stub 17 and the various brackets 20, the lower edges of the various leg parts defining a level plane. Therefore, when the cap part is removed it may be rested on any flat surface without damage. Since the wall of the cup 11 has a generally cylindrical contour the depending legs 41 are made in the form of cylindrical segments so as to fit the general contour of the exterior of the device.

A generalized description of the operation of the new device has been interwoven with the foregoing. As a convenient summary and amplification, the stubs 17 and 18 are externally provided with threads of the type used in connection with milk dairy plumbing. The usual couplings are used to couple the valve device in the pipe line where the flow is to be controlled. The valve is closed and opened by screwing up and down on the hand wheel 40, the valve closing tightly even though the cap 31 may be tilted slightly due to unequal tightening of the hand wheels 24 of the cap's clamp elements.

When open the milk flows smoothly through the valve, the interior of the device being free from all cracks, crevices and the like and having only the single joint closed by the replaceable paper gasket 30. The wall 25 flexes up and down to permit reciprocative movement of the valve head 28 to its opened and closed positions. This valve head 28 is made with a large diameter which, together with the large opening provided by the flaring wall 14 of the well, permits unrestricted flow when the valve head 28 is raised a relatively short distance, thus keeping the necessary valve motion within limited flexing extremes of the wall 25. Therefore, the latter does not have to be made with decided corrugations or the like but may be shaped only with the relatively shallow, smoothly interjoined, concavo-convex shape shown by the drawings. Due to the large diameter the restricted space, illustrated between the valve head 28 and the bottom 15 of the cup 11, is ample to provide for a full flow of the liquid up to the flow capacity of the coupling stubs 17 and 18.

When cleaning and sterilization is required the couplings are removed from the stubs 17 and 18 and the entire device may then be rested securely and safely on any flat surface by resting the device on the platform 19. The large hand wheel nuts 24 may then be quickly unscrewed and the bolts 21 swung outwardly, the abutment portions 23 preventing the bolts or the hand wheel nuts from striking the supporting surface. The entire cap may then be lifted off with the valve disassembling into the two main parts described. The illustrated construction speaks for itself respecting the ease with which it may be cleaned and sterilized. The legs 41 permit the cap or upper part to be rested on any flat surface without damage to the valve head, it being understood that the bottom surface of the valve head 28 and the seating surface 15 of the cup 11 should be kept smoothly finished and in a polished state.

Reassembly is simple, the parts being fitted together with a new paper gasket 30, the bolts 21 and hand wheel nuts 24 then being appropriately positioned and operated to effect reclamping. Although all of the hand wheel nuts 24 are preferably tightened equally, failure to do this does not render the device inoperative or unduly strain its parts. As previously described the rod 39 can flex to permit tight closing of the valve head even when the hand wheel nuts 24 are unequally tightened. The cap 31 is made in a considerably more massive manner than the rod 39 whereby uneven stress results in flexure of the rod 39 long before the cap 31 can receive damaging stress.

The design of the new valve makes it particularly adaptable to dairy service where valves must be used in the manner indicated schematically by Fig. 6. This figure shows three milk tanks 42, 43 and 44 respectively connected through valves 45, 46 and 47 with a common or main pipe line 48. Under some conditions it is necessary, for example, to close off either the tank 44 or 43 while permitting the flow to continue from the tank 42. In such instances three-way valves are required and this accounts for the common use of the rotary type of plug valve in dairies in spite of its recognized disadvantages.

The new valve has the advantage that its construction permits it to meet readily the above described type of service conditions. Thus in Fig. 7 the new valve is shown modified to the extent of being provided with two diametrically arranged pipe coupling stubs 49 and 50 which both open smoothly through the flaring wall 14 of the previously described well. In this instance the stubs 49 and 50 are arranged at right angles to the stub 17 and in line with each other. Other arrangements are possible without detracting from the operational and service advantages of the new device. Since the balance of the parts of the modification of Fig. 7 are the same as previously described similar numerals are applied to the corresponding parts. In using this modified construction the stubs 49 and 50 may be connected with the pipes forming the main line 48 in Fig. 6, the valve functioning as a three-way valve.

I claim:

1. A fluid valve including a casing provided with a wall having a flexible annular portion, a valve head secured to said wall inside of said portion and projecting inwardly from said wall, said casing having a valve seat positioned opposite to said valve and a fluid passage opening between said wall and said seat, said portion flexing to permit movement of said head to open and closed positions respecting said seat, and means for moving said head selectively to said positions, said wall and head being removable from said casing and said wall being provided with releasable means for securing it to said casing, said head moving means, wall, head and releasable means being interconnected in the form of a unit assembly and including a leg arrangement embracing the outside of said casing when said assembly is secured thereto and when said assembly is removed supporting said wall with said head hanging therefrom in a free and protected manner when said arrangement is rested on a supporting surface.

2. A fluid valve including a casing provided with a wall having a flexible annular portion, a valve head secured to said wall inside of said portion and projecting inwardly from said wall, said casing having a valve seat positioned opposite to said valve and a fluid passage opening between said wall and said seat, said portion flexing to permit movement of said head to open and closed positions respecting said seat, and means for moving said head selectively to said positions, said wall and head being removable from said casing and said wall being provided with releasable means for securing it to said casing, said head moving means, wall, head and releasable means being interconnected in the form of a unit assembly and including a leg arrangement embracing the outside of said casing when said assembly is secured thereto and when said assembly is removed supporting said wall with said head hanging therefrom in a free and protected manner when said arrangement is rested on a supporting surface, said releasable means comprising a plurality of clamp elements spaced around the periphery of said assembly, said elements having stops arranged to prevent them from swinging to the level of the bottom of said arrangement.

3. A two-part device for controlling the flow of beverages and the like and adapted for periodic disassembly, cleaning and sterilization, one part of said device comprising a one-piece integral casing internally forming a cup with a smoothly concave junction between its side and bottom walls and a well having a rounded bottom and a flaring side wall which opens centrally through the bottom wall of said cup with a smoothly convex junction therewith and said casing having pipe coupling stubs respectively opening smoothly into the side walls of said cup and well; and the other part of said device comprising a flexible sheet-like wall having a periphery separably fitting the periphery of said casing around the top of said cup, a valve having a base smoothly jointed integrally throughout with the inside of said wall inside of and spaced from said periphery and having a head fitting the bottom of said cup around said well and smoothly joined integrally with said base, a cap having a periphery registering with said registering casing and wall peripheries and a valve stem comprising a tubular member screw threaded through said cap and registering loosely with said base outside of said wall and a rod connecting with said head and projecting outwardly loosely through said member and having an end abutment loosely engaging the outer end of said member, rotation of said member opening and closing said valve respecting said well, said cap having outwardly extending radially slotted ears and said casing having bolts pivotally secured thereto to swing into and from said slotted ears and being provided with nuts to clamp said parts releasably together, said casing having the outside bottom of said well shaped to form a base which supports said casing upright when said base is rested on a supporting surface and said bolts having stops preventing them from swinging to a level below said well bottom.

4. A two-part device for controlling the flow of beverages and the like and adapted for periodic disassembly, cleaning and sterilization, one part of said device comprising a one-piece integral casing internally forming a cup with a smoothly concave junction between its side and bottom walls and a well having a rounded bottom and a flaring side wall which opens centrally through the bottom wall of said cup with a smoothly convex junction therewith and said casing having pipe coupling stubs respectively opening smoothly into the side walls of said cup and well; and the other part of said device comprising a flexible sheet-like wall having a periphery separably fitting the periphery of said casing around the top of said cup, a valve having a base smoothly jointed integrally throughout with the inside of said wall inside of and spaced from said periphery and having a head fitting the bottom of said cup around said well and smoothly joined integrally with said base, a cap having a periphery registering with said registering casing and wall peripheries and a valve stem comprising a tubular member screw threaded through said cap and registering loosely with said base outside of said wall and a rod connecting with said head and projecting outwardly loosely through said member and having an end abutment loosely engaging the outer end of said member, rotation of said member opening and closing said valve respecting said well, said casing parts having clamps releasably clamping said parts together with said cap periphery clamping said wall periphery to said casing periphery, said cap having a depending leg arrangement embracing said casing when said parts are clamped together and said arrangement being shaped to support said wall with said head hanging therefrom in a free and protected manner when said cap part is separated and said leg arrangement is rested on a supporting surface.

5. A two-part device for controlling the flow of beverages and the like and adapted for periodic disassembly, cleaning and sterilization, one part of said device comprising a one-piece integral casing internally forming a cup with a smoothly concave junction between its side and bottom walls and a well having a rounded bottom and a flaring side wall which opens centrally through the bottom wall of said cup with a smoothly convex junction therewith and said casing having pipe coupling stubs respectively opening smoothly into the side walls of said cup and well; and the other part of said device comprising a flexible sheet-like wall having a periphery separably fitting the periphery of said casing around the top of said cup, a valve having a base smoothly jointed integrally throughout with the inside of said wall inside of and spaced from said periphery and having a head fitting the bottom of said cup around said well and smoothly joined integrally with said base, a cap having a periphery registering with said registering casing and wall peripheries and a valve stem comprising a tubular member screw threaded through said cap and registering loosely with said base outside of said wall and a rod connecting with said head and projecting outwardly loosely through said member and having an end abutment loosely engaging the outer end of said member, rotation of said member opening and closing said valve respecting said well, said cap having outwardly extending radially slotted ears and said casing having bolts pivotally secured thereto to swing into and from said slotted ears and being provided with nuts to clamp said parts releasably together, said casing having the outside bottom of said well shaped to form a base which supports said casing upright when said base is rested on a supporting surface and said bolts having stops preventing them from swinging to a level below said well bottom, said cap having a depending leg arrangement embracing said casing when said parts are clamped together and said arrangement being shaped to support said wall with said head hanging therefrom in a free and protected manner when said cap part is separated and said leg arrangement is rested on a supporting surface.

References Cited in the file of this patent

UNITED STATES PATENTS

| Number | Name | Date |
|---|---|---|
| 155,699 | Bolton | Oct. 6, 1874 |
| 1,094,761 | Thousand | Apr. 28, 1914 |
| 1,693,407 | Shand | Nov. 27, 1928 |
| 1,780,242 | Replogle | Nov. 4, 1930 |
| 1,992,043 | Saunders | Feb. 19, 1935 |
| 2,120,961 | Beede | Jan. 21, 1938 |
| 2,374,478 | Folke | Apr. 24, 1945 |

FOREIGN PATENTS

| Number | Country | Date |
|---|---|---|
| 12,688 | Great Britain | 1900 |